United States Patent [19]

Hayashi et al.

[11] Patent Number: 5,638,264
[45] Date of Patent: Jun. 10, 1997

[54] PARALLELIZED POWER SUPPLY SYSTEM PROVIDING UNINTERRUPTED OPERATION

[75] Inventors: Katsunori Hayashi, Odawara; Akihiko Kanouda, Hitachinaka; Tadashi Takahashi, Hitachi; Hideaki Horie, Hitachi; Kenichi Onda, Hitachi; Yasuo Abe, Chigasaki; Masayoshi Sato, Hitachi, all of Japan

[73] Assignee: Hitachi, Ltd., Tokyo, Japan

[21] Appl. No.: 544,240

[22] Filed: Oct. 17, 1995

Related U.S. Application Data

[63] Continuation-in-part of Ser. No. 364,771, Dec. 27, 1994.

[30] Foreign Application Priority Data

| Dec. 27, 1993 | [JP] | Japan | 5-331022 |
| Oct. 19, 1994 | [JP] | Japan | 6-280055 |
| Nov. 29, 1994 | [JP] | Japan | 6-294872 |

[51] Int. Cl.$^6$ .................................................. H02M 7/155
[52] U.S. Cl. ................................................ 363/65; 307/82
[58] Field of Search .............................. 363/13, 65, 84, 363/123, 125; 307/23, 52, 11, 82

[56] References Cited

U.S. PATENT DOCUMENTS

| 3,665,502 | 5/1972 | Means | 363/102 |
| 3,739,186 | 6/1973 | Gokey et al. | 363/13 |
| 4,628,431 | 12/1986 | Kayser | 363/49 |
| 5,157,269 | 10/1992 | Jordan et al. | 307/59 |
| 5,418,707 | 5/1995 | Shimer et al. | 363/65 |

FOREIGN PATENT DOCUMENTS

272638 U  6/1990  Japan .

OTHER PUBLICATIONS

R. Wu, et al. "Load-Current-Sharing Control for Parallel Operation of DC-to-DC Converters", IEEE, PESC-1993, pp. 101–107.

D. Azzis, et al., "Parallel Identical Direct-Mode DC-DC Converters", IBM Technical Disclosure Bulletin, vol. 25, No. 2, Jul. 1982, pp. 624–625.

LinCMOS μPower Precision Quad Operational Emplifier TLC1079, Texas Instruments, 1992, pp. 2–779–2–794.

*Primary Examiner*—Peter S. Wong
*Assistant Examiner*—Adolf Berhane
*Attorney, Agent, or Firm*—Kenyon & Kenyon

[57] ABSTRACT

A parallelized power supply system including a plurality of switching power supplies each having a circuit for limiting rush current generated when a main switch is turned on. This system can be installed in an apparatus which requires the functions such as power uninterrupted operation and live wire insertion/dismount. Each switching power supply has another power supply for driving the rush current limiter circuit and a relay circuit for supplying relay driving current and making a connection of relay contacts after a predetermined time lapse after the operation start of the switching power supply. An a.c. power is supplied via the relay contacts to each switching power supply. The relay driving time set in the rush current limiter circuit is different for each switching power supply. Accordingly, concentration and excess of rush current when the relay is driven can be suppressed, and sparks at contact pins of a connector to be otherwise generated when the switching power supply is mounted on the connector, can be eliminated so that radiation noises and connector breakage can be avoided. Each of the switching power supplies connected in parallel has a current detecting resistor connected between the low voltage side of a load and the low voltage side of a voltage regulator d.c. output, and at least one operational amplifier for detecting a change in the d.c. output, the negative power supply terminal of the operational amplifier being connected to the current detecting resistor at its one end on the load side.

18 Claims, 10 Drawing Sheets

← INSERTION DIRECTION OF SWITCHING POWER SUPPLY 64

PARALLELIZED POWER SUPPLY SYSTEM PROVIDING UNINTERRUPTED OPERATION

RELATED APPLICATIONS

This Application is a Continuation-In-Part Application of co-pending application Ser. No. 08/364,771 entitled "POWER SUPPLY SYSTEM" filed by T. Takahashi et al. on Dec. 27, 1994, the contents of which are incorporated herein by reference.

BACKGROUND OF THE INVENTION

1. Field of the Invention

The present invention relates to a parallelized power supply system, and more particularly to a parallelized power supply system suitable for use with AC-DC switching regulator power supplies which supply one or a plurality of d.c. powers to an apparatus whose uninterrupted operation is indispensable, such as an external storage device of a computer system.

Controls of parallelized power supplies are disclosed in "Load-Current-Sharing control for Parallel Operation of DC-to-DC Converters", by R. Wu et al., IEEE PESC-1993, pp. 101–107, "PARALLEL IDENTICAL DIRECT-MODE DC-DC CONVERTERS", by D. Azzis, et al., IBM Technical Disclosure Bulletin, Vol. 25, No. 2, July 1982, pp. 624–625, and JP-A-2-72638 (U). An operational amplifier relevant to this application is disclosed in LinCMOS µPOWER PRECISION QUAD OPERATIONAL AMPLIFIER TLC1079, TEXAS INSTRUMENTS, 1992, pp. 2-779 to 2-794.

2. Description of the Related Art

A conventional parallelized power supply system is associated with the following problems, from the viewpoint of satisfying the requirements by recent apparatuses such as uninterrupted operation of power supplies, live wire insertion/dismount of an AC-DC switching power supply (one or more power supplies among a plurality of power supplies under operation are replaced for the maintenance or because of defects without stopping the other power supplies), and downsizing (high performance with compact size).

Conventionally, a switch and a cable of a commercial a.c. power supply connected to AC-DC switching regulator power supplies or switching power supplies are positioned on the maintenance side, e.g., on a side panel or back panel of the apparatus. Therefore, a maintenance person can easily access these switch and cable, and the switching regulator power supplies may be inadvertently turned off.

Still further, switching power supplies for the same d.c. output voltage are run in parallel for the purpose of uninterrupted operation so that the total number of switching power supplies increases. The total amount of rush current flowing through the switching power supplies may flow through the commercial a.c. power supply at the worst. This too large rush current may break the commercial a.c. power supply facilities connected to the apparatus, and the operation of the apparatus may eventually be stopped.

In a conventional control of power supply voltage detection, two positive and negative d.c. power supplies are required in order to drive an operational amplifier used in a current detector circuit. Power for driving these two power supplies and power for driving loads are supplied from the same power supply system. Therefore, the power supply system is difficult to be made compact because of these two positive and negative d.c. power supplies.

SUMMARY OF THE INVENTION

It is an object of the present invention to solve the above-described conventional problems and provide a parallelized power supply system of high reliability capable of reducing rush current when an a.c. power is supplied to the power supply board while ensuring the functions necessary for uninterrupted operation, such as live wire insertion/dismount of a switching power supply into/from the power interface board.

It is another object of the present invention to provide a power supply system capable of efficiently detecting a load voltage and having an improved power supply for an operational amplifier which monitors the load voltage.

According to one aspect of the present invention, there is provided a parallelized power supply system, comprising:

a switch connectable to an a.c. power supply; and a plurality of switching power supplies each connected to the switch, wherein each of the switching power supplies comprises:

a relay contact unit to be connected to the switch, the relay contact unit having relay contacts and a relay coil;

an AC-DC converter for converting an a.c. power supplied via the switch and the relay contact unit into a d.c. power;

a resistor connected in parallel to the relay contact unit; and a relay driving power supply for receiving power from the a.c. power supply via the switch and the resistor, supplying a d.c. power for activating or inactivating the relay contact unit, and making a connection of the relay contact unit by supplying driving current to the relay coil if a predetermined time lapses after the power is received from the a.c. power supply and a voltage of the d.c. power reaches a predetermined level.

The AC-DC converter may comprise:

a rectifier circuit for rectifying a.c. current supplied from the a.c. power supply;

a power regulator connected to the rectifier circuit for regulating a d.c. voltage supplied from the rectifier circuit;

a differential amplifier operable with a single power supply voltage for detecting a d.c. current supplied to a load and flowing from a high voltage side of the load to a low voltage side of the load;

a wire interconnecting a low voltage side of the single power supply voltage for the differential amplifier and the low voltage side of the load;

another wire interconnecting a high voltage side of the single power supply voltage for the differential amplifier and the high voltage side of the load;

a resistor for flowing the d.c. current supplied to the load from the high voltage side of the load to the low voltage side of the load, the resistor being connected between the low voltage side of the load and a high voltage side of the power regulator; and two resistors connected between two input terminals of the differential amplifier and both ends of the resistor for flowing the d.c. current.

In a parallelized power supply system assembled in an electronic apparatus and having parallelized AC-DC switching power supplies for supplying a d.c. power to the apparatus, the AC-DC switching power supplies are grouped into each d.c. output voltage for a load. Each AC-DC switching power supply has a relay and a rush current limiter circuit which operates when a commercial a.c. power supply of the apparatus is turned on. The rush current limiter circuit controls the relay so that connection/disconnection of the commercial a.c. power supply can be effected by relay contacts at a delayed timing different for each d.c. output voltage.

Each AC-DC switching power supply is mounted via a connector of a power interface printed circuit board which supplies a d.c. power to logic circuits and the like of the electronic apparatus. Accordingly, a commercial a.c. power can be inputted via the circuit board and a d.c. output can be supplied via the circuit board.

Each of AC-DC switching power supplies grouped into each d.c. output voltage for a load has a relay and a rush current limiter circuit which operates when a commercial a.c. power supply to an apparatus is turned on. The rush current limiter circuit controls the relay so that connection/ disconnection of the commercial a.c. power supply can be effected by relay contacts at a delayed timing different for each d.c. output voltage. Accordingly, the operation of each AC-DC switching power supply can be started at a different timing after the main switch is turned on, and concentration and excess of rush current can be avoided.

Further, since a sufficient time can be given for mounting each AC-DC switching power supply on the connector of the circuit board, sparks at contact pins of the connector can be eliminated when the AC-DC switching power supply is mounted, so that radiation noises and connector breakage can be avoided while eliminating inadvertent works during maintenance and improving reliability.

Each AC-DC switching power supply having a voltage regulator for supplying a d.c. power to a load has a current detecting resistor and at least one operational amplifier. The current detecting resistor is connected between the low voltage side of the load and the low voltage side of the voltage regulator d.c. output, and the negative power supply terminal of the operational amplifier is connected to the current detecting resistor at its one end on the load side. The voltage across the current detecting resistor can be detected by the operational amplifier.

The voltage regulator provided in the AC-DC switching power supply for converting a.c. into d.c., for smoothing a d.c. voltage, and for stabilizing current or voltage by feedback, supplies current to the load. This current passing through the load flows into the current detecting resistor and is returned back to the voltage regulator. Therefore, a voltage drop proportional to the load current is generated across the current detecting resistor. This voltage is detected by the operational amplifier whose negative power supply terminal is connected to the current detecting resistor at its one end on the load side, the current detecting resistor being connected between the low voltage side of the load and the low voltage side of a voltage regulator d.c. output. One end of the current detecting resistor on the high voltage side connected to the load is connected to the non-inverting input terminal of the operational amplifier, and the other end thereof on the low voltage side connected to the voltage regulator is connected to the inverting input terminal. If an operational amplifier having a minimum value of the non-inverting input voltage lower than 0 V, for example, −0.2 to −0.3 V is used, this operational amplifier operates normally under the condition that a product of the resistance value of the current detecting resistor and a rated d.c. output current is 0.2 to 0.3 V or smaller. From the output terminal of the operational amplifier, a positive voltage proportional to the voltage across the current detecting resistor is outputted, relative to a reference voltage on the low voltage side of the load. Accordingly, a voltage lower than that at the negative voltage supply terminal of the operational amplifier can be detected by the operational amplifier.

DETAILED DESCRIPTION OF THE PREFERRED EMBODIMENTS

Embodiments of a parallelized power supply system of this invention will be described in detail with reference to the accompanying drawings.

Figure 1:
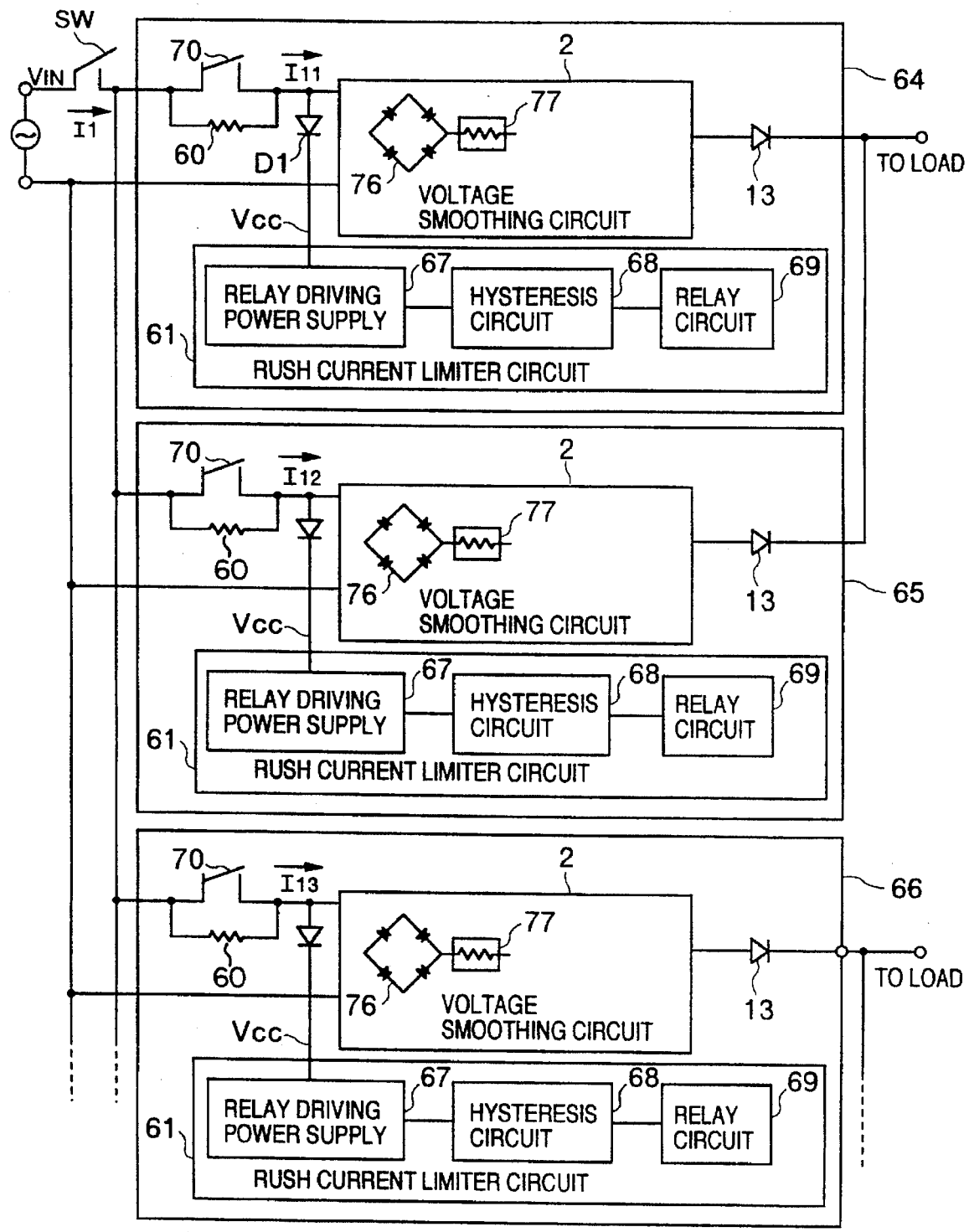
FIG. 1 is a block diagram showing an example of the structure of a power supply system according to an embodiment of the invention.

A power supply system according to an embodiment of the invention shown in FIG. 1 is assembled in an apparatus which uses power from the power supply system. This system has a plurality of switching power supplies 64, 65, 66, . . . . Each set of two or more switching power supplies supplies power to a load 9 such as a logic circuit via a reverse current stopping diode 13. The switching power supplies 64 and 65 (hereinafter called group A) are run in parallel, and the switching power supply 66 and another switching power supply not shown (hereinafter called group B) are also run in parallel. The switching power supply groups A and B output different d.c. voltages.

Each switching power supply 64, 65, 66, . . . of the power supply system of this embodiment has a relay (only its contact 70 is shown in FIG. 1) and a rush current limiter circuit 61. Power from a commercial a.c. power supply is supplied via this relay contact 70 to each switching power supply. The relay is driven by the rush current limiter circuit 61. This circuit 61 energizes the relay after a predetermined delay time from when a voltage of the commercial a.c. power supply reaches a predetermined level after a main switch SW is turned on. The main switch SW is assembled on the apparatus inclusive of the loads and the power supply system. The relay is inactivated when the voltage of the commercial a.c. power supply reaches another predetermined level after the main switch SW is turned off.

In this embodiment shown in FIG. 1, the delay time for the relay contact 70 of the switching power supply group A is set to T1 second which is determined by resistance of a resistor in parallel to the relay contact 70 and another resistor and capacitance of a capacitor. The delay time for the relay contact 70 of the switching power supply group B is set to T2 second different from T1 second.

Figure 2:
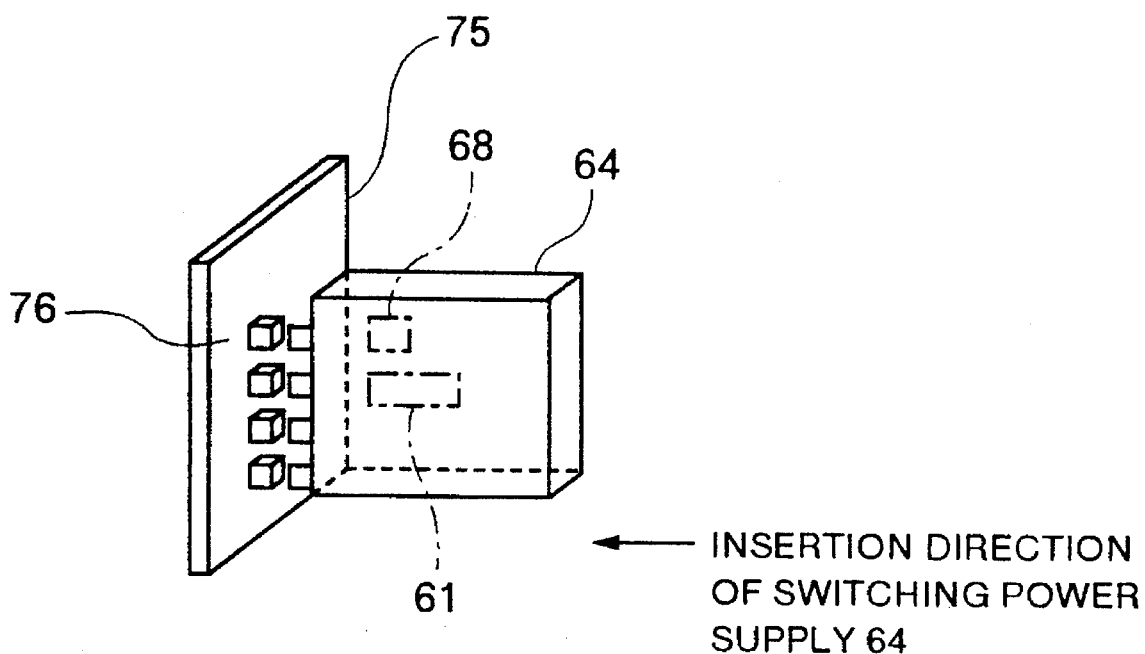
FIG. 2 is a perspective view illustrating a mount of an AC-DC switching power supply according to an embodiment of the invention.

In the power supply system having the AC-DC switching power supplies 64, 65, 66, . . . constructed as above, each switching power supply 64, 65, 66, . . . is mounted through a connector 76 on a printed circuit board 75 to be used, for example, for power interface, as shown in FIG. 2. Each switching power supply receives power from the commercial a.c. power supply via the printed circuit board 75 and connector 76, converts the a.c. power into a d.c. power, and supplies the d.c. power via the connector 76 to the board 75 which then applies a d.c. voltage to each load such as a logic circuit mounted on the apparatus.

Next, the operation of the power supply system of this embodiment, when the main switch SW in an off-state is turned on, will be described with reference to FIG. 3.

After the voltage of the commercial a.c. power supply applied to each switching power supply 64, 65, 66, . . . reaches the predetermined level after the main switch SW is turned on, the relay contact 70 of the switching power supply group A at a certain voltage level is turned on after the delay time of T1 second, whereas the relay contact 70 of the switching power supply group B is turned on after the delay time of T2 second. Rush current starts flowing after the delay times of T1 and T2.

The total amount of rush current flowing through the switching power supply group A is $I_{11}$ and $I_{12}$, and the total amount of rush current flowing through the switching power supply group B is $I_{13}$ and $I_{14}$. The rush current $I_1$ flowing through the commercial a.c. power supply is not the sum of $I_{11}$, $I_{12}$, $I_{13}$, and $I_{14}$ because the rush current flows through the switching power supply groups A and B at different timings. Therefore, the peak rush current $I_{1peak}$ flowing through the commercial a.c. power supply can be greatly reduced as compared to a conventional power supply system.

The delay times of T1 and T2 can be set as desired. If the delay time of T1 is set differently between the switching power supplies 64 and 65, the peak rush current shown in FIG. 3 and flowing through the commercial a.c. power supply can be reduced further. This is also applicable to the delay time T2. If these delay times are set to several seconds in which time period a maintenance person can finish mounting the switching power supply on the printed circuit board 75 shown in FIG. 2 via the connector 76 in a live wire state, then a rush current will not flow through the switching power supply. In addition, sparks can be prevented from being generated between the connector 76 and the switching power supply, radiation noises and breakage of the connector can also be eliminated.

The rush current limiter circuit 61 can be controlled to be driven and not driven at different input level voltages of the commercial a.c. power supply. Therefore, as shown in FIG. 3, the relay can be controlled to stop its operation when the input voltage level of the commercial power supply lowers to a predetermined level after the main switch SW is turned off. In this embodiment, a hysteresis circuit 68 supplied with a voltage Vcc and having differential amplifiers DA1 and DA2 (refer to FIG. 4) can easily give the hysteresis characteristics to the input voltage levels at which the switching power supply is driven and inactivated, as shown in FIG. 3. In addition, a stable on/off of a d.c. output voltage is ensured even while the voltage of the commercial power supply is unstable, and a malfunction of the apparatus and a latch-up or hang-up of a succeeding stage circuit can be avoided. Without this hysteresis circuit 68, an output of a relay drive circuit 67 shown in FIG. 1 may be directly supplied a relay circuit 69 shown in FIG. 1 to drive the relay.

Next, an example of the rush current limiter circuit 61 will be described with reference to FIG. 4.

Figure 4:
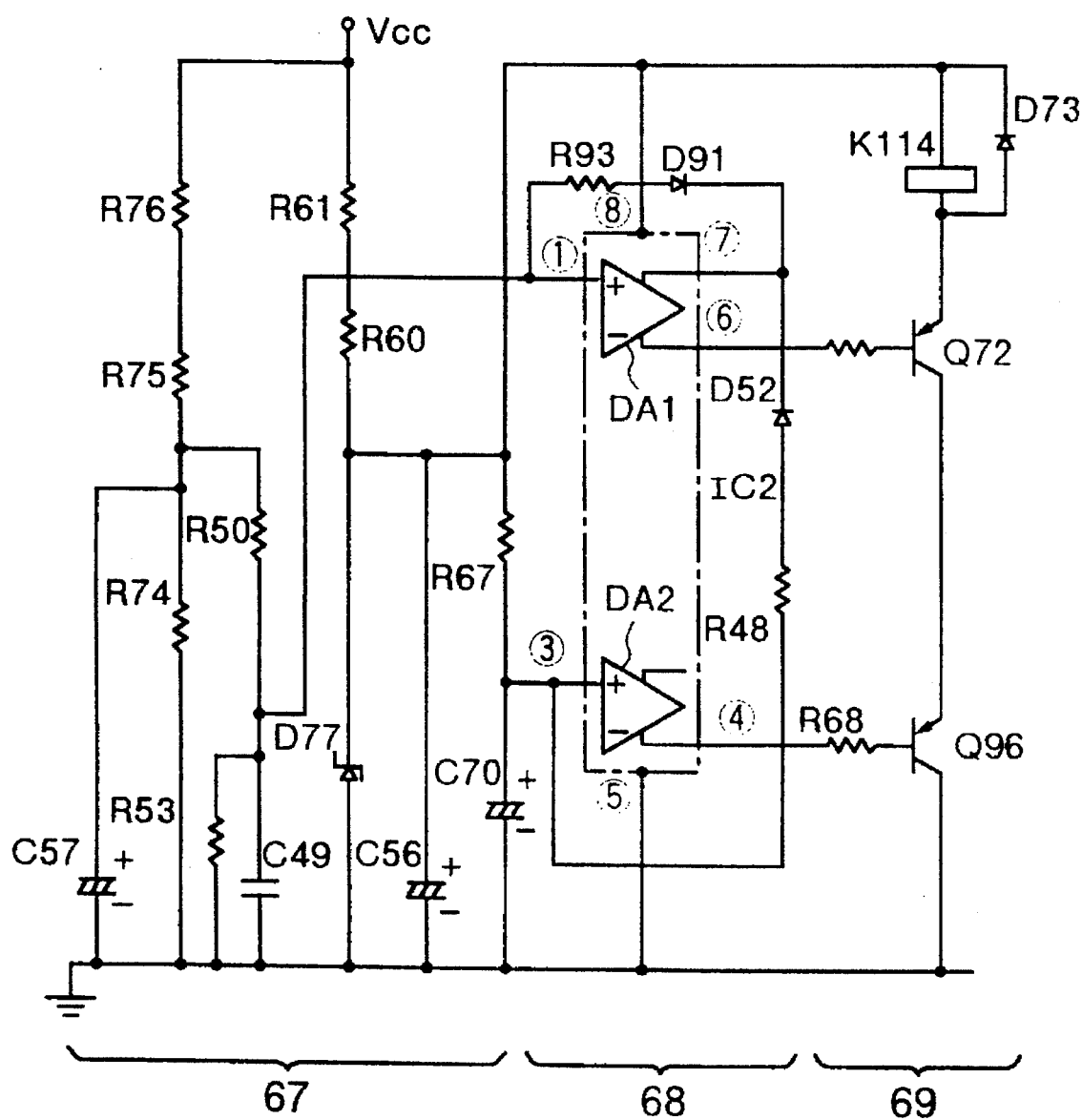
FIG. 4 is a circuit diagram showing an example of the structure of a rush current limiter circuit.

In FIG. 4, Vcc represents a power supply voltage applied to the rush current limiter circuit 61. This voltage Vcc is supplied from the commercial a.c. power supply via a resistor 60 in parallel with the relay contact 70 and a rectifier diode D1, immediately after the switching power supply with the rush current limiter circuit 61 is coupled to the connector 76 or immediately after the main switch SW of the apparatus is turned on. This voltage Vcc may be used for monitoring an input voltage of the commercial a.c. power supply.

As shown in FIG. 4, the rush current limiter circuit 61 is constituted by an IC 2, a relay, transistors Q72 and Q96, and a number of resistors and capacitors. IC 2 has two differential amplifiers constituting the hysteresis circuit 68, and eight input/output pins indicated by reference numerals 1 to 8 in circles. The relay is controlled by the IC 2 and has the relay contact 70 and a relay coil K114. The transistors Q72 and Q96 operate as a driver of the relay coil K114. IC 2 operates when the power supply voltage Vcc is applied to the pin 8 via resistors R61 and R60.

IC 2 of the rush current limiter circuit 61 starts operating as the voltage Vcc rises after the switching power supply 64, 65, 66, . . . is connected to the connector 76 or after the main switch SW of the apparatus is turned on. The differential amplifier DA1, whose output is supplied to the pin 6 of IC 2, monitors a voltage applied to the pin 1, i.e., the d.c. voltage Vcc converted from an a.c. input voltage of the commercial a.c. power supply. When this voltage reaches a predetermined level, the transistor Q 72 is turned on via the pin 6. This differential amplifier DA1 turns off the transistor Q 72 when the voltage Vcc applied to the pin 1 lowers abnormally. The differential amplifier DA1 together with a resistor R93 and a diode D91 gives the hysteresis characteristics of input voltage levels at which the transistor Q72 is turned on and off. The hysteresis characteristics ensure a stable on/off of a d.c. output voltage even while the voltage of the commercial power supply is abnormally low, and avoid a malfunction of the apparatus and a hang-up of a succeeding stage circuit. One differential amplifier and a transistor connected thereto can drive the coil K114. Two differential amplifiers and two transistors connected thereto shown in FIG. 4 can avoid an unstable operation of outputs of both the differential amplifiers DA1 and DA2 to the transistors Q72 and Q 96 immediately after the power is turned on.

The pin 2 of IC 2 is supplied with a voltage from a timer circuit made of a resistor R67 and a capacitor C70. This voltage is monitored by the differential amplifier DA2 which in turn turns on the transistor Q96 via the pin 4 after a predetermined delay time determined by the time constant of the timer circuit after the voltage Vcc rises. The delay time when the transistor Q96 turns on after the voltage Vcc rises can be set arbitrarily by the time constant determined by the resistor R67 and capacitor C70 of the timer circuit. The relay contact 70 (refer to FIG. 1) of the relay is turned on when both the transistors Q72 and Q96 are turned on by the current flowing through the coil K114, and is turned off when one of the transistors Q72 and Q96 is turned off.

Figure 3:
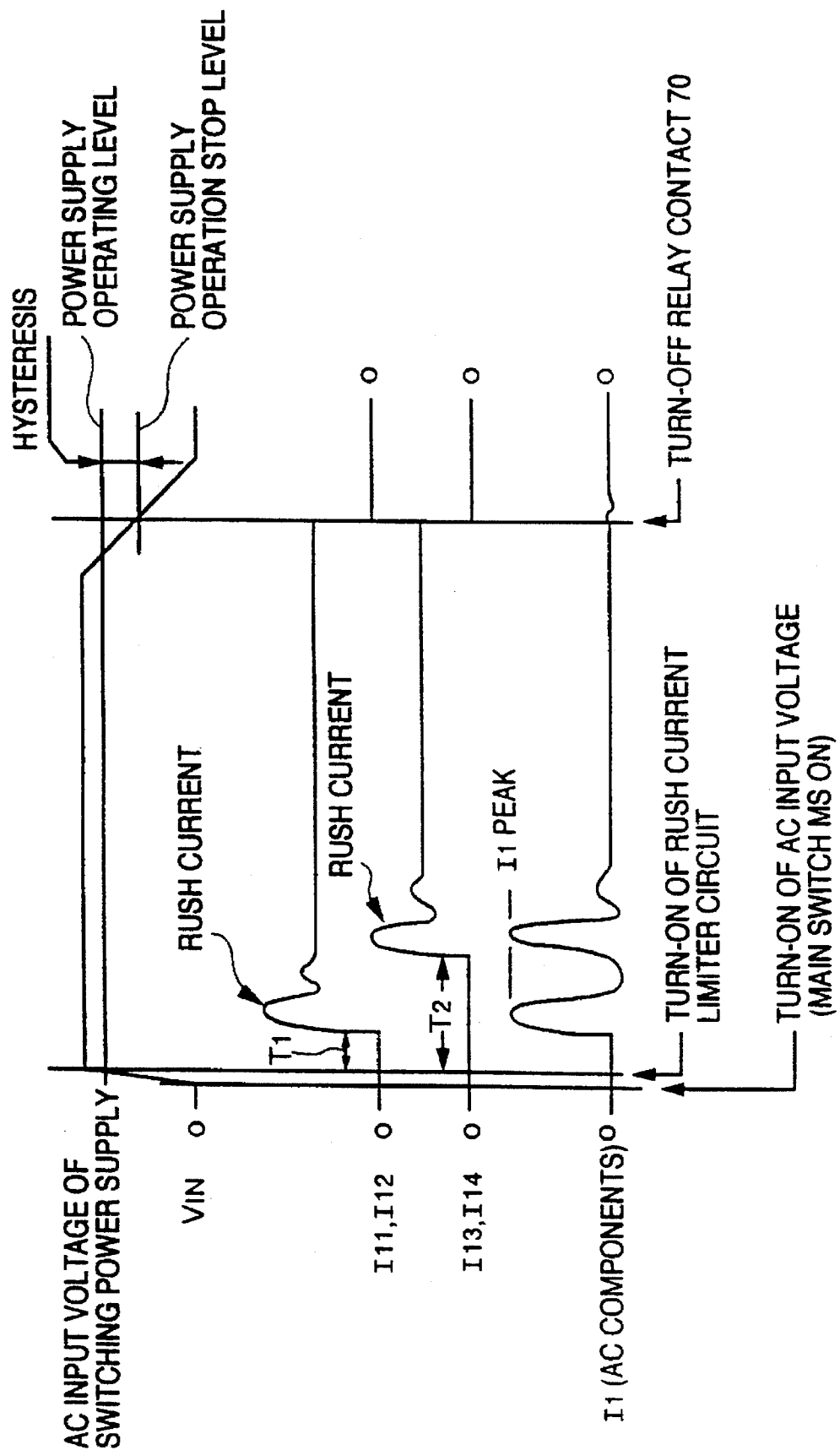
FIG. 3 shows waveforms illustrating the operation of the embodiment power supply system.

The above-described operation of the rush current limiter circuit 61 controls the switching power supply in the manner described with FIGS. 1 and 3.

The parallelized power supply system of this embodiment having such rush current limiter circuits can prevent concentration and excess of rush current of the power supply system and can ensure an uninterrupted operation of the apparatus assembled with AC-DC switching power supplies. In addition, insertion/dismount of a switching power supply in a live wire state or replacement thereof for maintenance or because of failure can be reliably performed, and a malfunction of the apparatus or a malfunction because of an abnormally low voltage of the commercial a.c. power supply can also be avoided.

Although rush current flows through the rush current limiter circuit 61 when it starts operating after the switching power supply is connected to the connector 76 or after the main switch SW of the apparatus is turned on, this rush current is small and does not adversely affect the other circuits, as compared to the rush current caused by the power supplied to the loads.

In the embodiment shown in FIG. 1, a voltage rectifying and smoothing circuit 2 has a bridge rectifier circuit 76 connected to the relay contact 70 or another rectifier circuit. A power thermistor 77 may be connected or not connected to an output of the rectifier circuit, the resistance value of the thermistor being smaller at a large current than at a small current.

Figure 5:
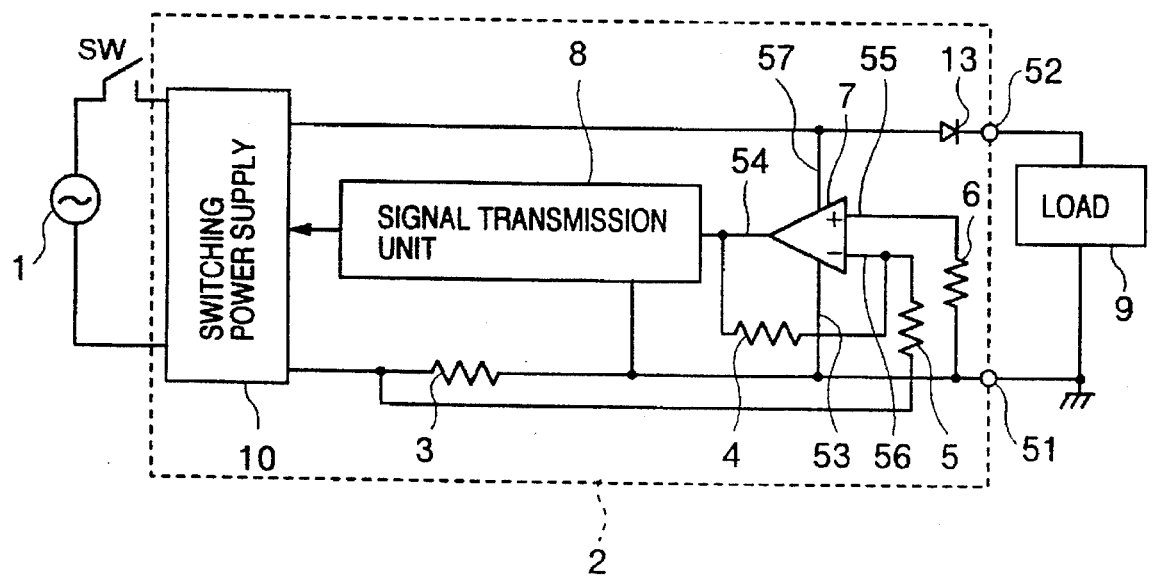
FIG. 5 is a circuit diagram partially in blocks showing an example of the structure of a power supply system according to another embodiment of the invention.

FIG. 5 shows an example of the structure of the voltage smoothing circuit 2 or AC-DC converter. In FIG. 5, reference numeral 3 represents a current detecting resistor, reference numeral 4 represents a feedback resistor, reference numerals 5 and 6 represent an input resistor, reference numeral 7 represents an operational amplifier, reference numeral 8 represents a signal transmission unit 8, reference numeral 9 represents a load, reference numeral 10 represents a voltage regulator or a switching power supply 10, reference numeral 51 represents a ground terminal, reference numeral 52 represents a d.c. output terminal, reference numeral 53 represents a negative power supply terminal, reference numeral 54 represents an output terminal, reference numeral 55 represents a non-inverting input terminal, reference numeral 56 represents an inverting input terminal, and reference numeral 57 represents a positive power supply terminal.

An external a.c. power supply 1 is connected to the voltage regulator 10 of the AC-DC converter 2 which is coupled to the d.c. output terminal 52 via the reverse current stopping diode 13 and to one end of the current detecting resistor 3. The other end of the current detecting resistor 3 is connected to the ground terminal 51. The load 9 is connected between the d.c. output terminal 52 and the ground terminal 51.

The operational amplifier 7 used in this embodiment is an operational amplifier of the type that it can operate with a single power supply voltage without using two positive and negative power supply voltages and that a negative voltage can be applied to the non-inverting terminal 55, for example, a minimum negative voltage of −0.2 V to −0.3 V.

The operational amplifier 7 has the negative power supply terminal 53, output terminal 54, non-inverting input terminal 55, inverting input terminal 56, and positive power supply terminal 57. Of these, the positive power supply terminal 57 is connected to the d.c. output terminal 52, the negative power supply terminal 53 is connected to the ground terminal 51, and the non-inverting input terminal 55 is connected via the input resistor 6 to the ground terminal. The GND terminal of the operational amplifier 7 is therefore connected to the GND side of the load 9. The inverting input terminal 56 is connected via the input resistor 5 to an interconnection between the voltage regulator 10 and the current detecting resistor 3. The output terminal 54 is connected via the feedback resistor 4 to the inverting input terminal 56, and also connected to the signal transmission unit 8 which is grounded. The signal transmission unit 8 is, for example, a photocoupler or a photoisolator which transmits a voltage change of an output of the operational amplifier 7 to the voltage regulator 10 while suppressing noises from being transmitted from the external a.c. power supply 1 to the voltage regulator 10. The reverse current stopping diode 13 is required if the outputs of a plurality of switching power supplies having the same voltage are supplied to the same load 9. However, if only a single switching power supply is sufficient (for example, if +12 V is supplied from only the switching power supply 66), the diode 13 is not necessary and the positive output from the voltage smoothing circuit 2 is directly supplied to the load 9. Also in this case, the GND terminal of the operational amplifier 7 is connected to the GND side of the load 9.

An a.c. voltage supplied from the external a.c. power supply 1 is inputted to the voltage regulator 10 of the AC-DC converter 2 and converted into a stable d.c. voltage. A d.c. current therefore flows through a closed loop path from the d.c. output terminal 52 to the load 9, from the ground terminal 51 to the current detecting resistor 3, and back to the voltage regulator 10. The same current flowing through the load 9 flows through the current detecting resistor 3 across which a voltage drop is generated, the voltage drop being a product of the load current and the resistance value of the current detecting resistor 3. The potential at the end of the current detecting resistor 3 connected to the ground terminal is 0. Therefore, the potential at the other end of the current detecting resistor 3 is negative. This negative voltage is called hereinafter a detection voltage. The positive and negative power supply terminals 57 and 53 of the operational amplifier 7 are connected in parallel to the load 9, so that the voltage same as across the load 9 is applied to the operational amplifier 7 and power is supplied to this amplifier 7. The potential at the non-inverting input terminal 55 of the operational amplifier 7 connected via the input resistor 6 to the ground terminal 51 is 0, whereas the inverting input terminal 56 connected via the input resistor 5 to the interconnection between the voltage regulator 10 and the current detecting resistor 3 is applied with the detection voltage. The absolute value of the detection voltage is preferably made small because of a thermal loss in the current detecting resistor 3. For example, it is preferable to set the absolute value of the detection voltage to about 0.1 V or lower at a maximum load current. The value of the current detecting resistor 3 is preferably set to about 1 mΩ to 2 mΩ at a maximum load current of 50 A. The operational amplifier 7 can operate normally under the condition that a product of the resistance value of the current detecting resistor 3 and the rated output current of the switching power supply is 0.2 V to 0.3 V or lower, even if the minimum value of a voltage applied to the non-inverting input terminal 55 is negative, for example, about −0.2 V to −0.3 V. Outputted at the output terminal of the operational amplifier 7 is a positive voltage proportional to the voltage across the current detecting resistor 3, relative to the low potential side of the load 9. An operational amplifier TLC 1079 of TEXAS INSTRUMENTS or other compatible amplifiers may be used as the operational amplifier 7.

The detection voltage applied to the inverting input terminal 56 of the operational amplifier 7 is amplified by a factor proportional to a ratio G of the feedback resistor 4 to the input resistor 5, and outputted from the output terminal 54. This ratio is required to satisfy the following condition in order to avoid a voltage saturation at the output terminal 54. Specifically, the ratio G of the feedback resistor 4 to the input resistor 5 is made sufficiently smaller than a ratio of a d.c. output voltage of the AC-DC converter 2 to a maximum absolute value of the detection voltage so that an output of the operational amplifier 7 becomes smaller than the d.c. output voltage. For example, assuming that a maximum absolute value of the detection voltage is 100 mV and the d.c. output voltage of the AC-DC converter 2 is 5 V, the ratio is 50:1. In this case, the ratio G is preferably set to about 10 to 20 sufficiently smaller than the ratio 50. If the input resistor 5 is 1 kΩ, the feedback resistor 4 is preferably 10 kΩ to 20 kΩ.

A voltage at the output terminal 54 is G times the detection voltage and is proportional to an instantaneous value of the load current. This voltage is transferred to the voltage regulator 10 by the signal transmission unit 8, and is used for controlling the load current. A control method is, for example, to control the d.c. output voltage to be constant. A so-called voltage lowering control can be realized by using a protection circuit which lowers the output voltage when an excessive current larger than a desired current flows, for the protection of the switching power supply.

In this embodiment, it is possible to quickly and precisely detect a load current by using a simple circuit structure and an operational amplifier with a single power supply voltage without using dedicated positive and negative power supply voltages for it. It is therefore possible to promote reducing the number of circuit components and the cost and size of the apparatus. The circuit shown in FIG. 5 without the diode 13 can be used for the control of not only a parallelized power supply system but also a single switching power supply with a single AC-DC converter.

In this embodiment, although an AC-DC converter for converting an a.c. voltage into a d.c. voltage has been described, a DC-DC converter for converting a d.c. voltage into a different d.c. voltage or other electronic devices may also be used.

Figure 6:
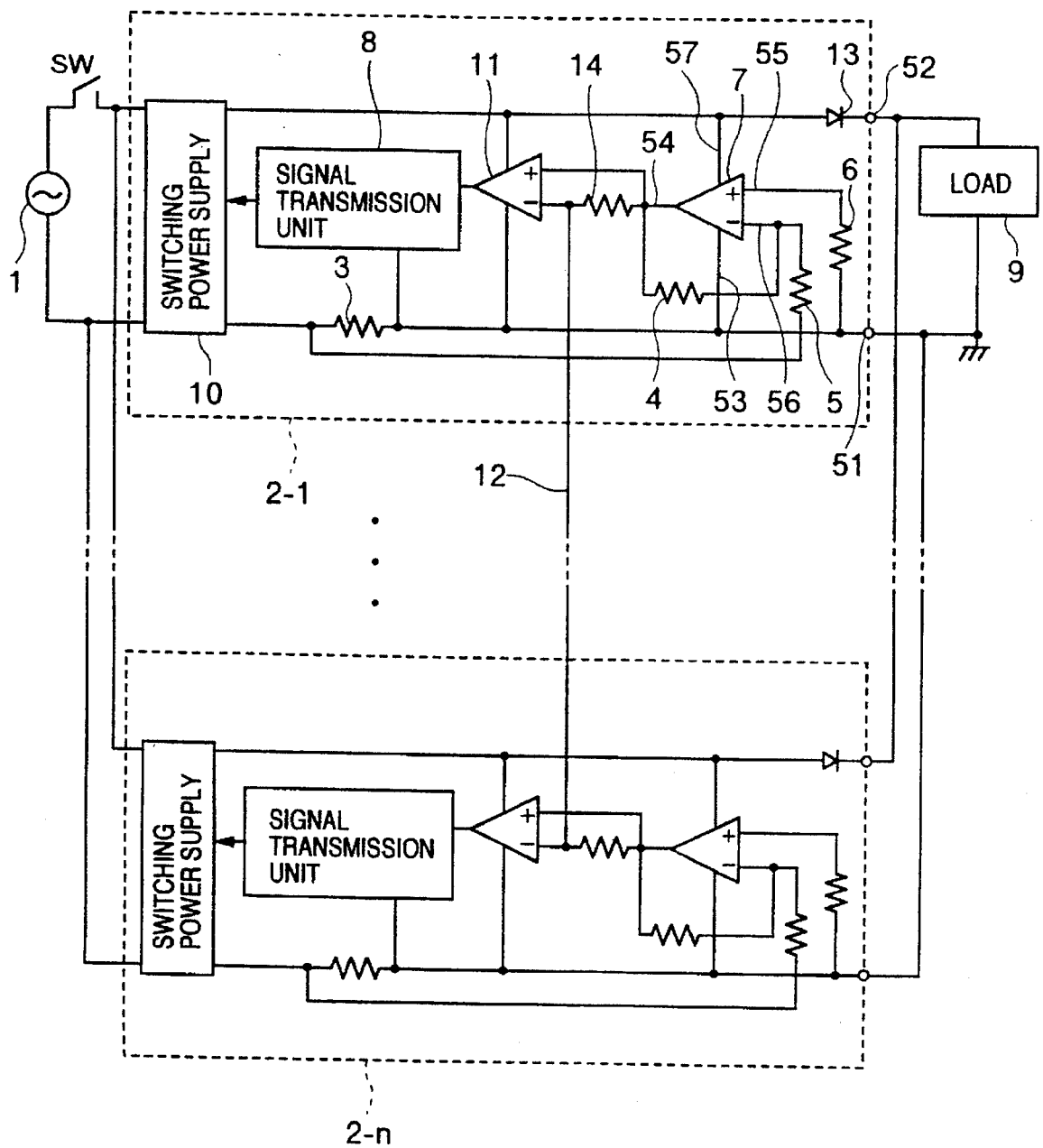
FIG. 6 is a circuit diagram partially in blocks showing an example of the structure of a power supply system according to still another embodiment of the invention.

FIG. 6 shows the structure of a voltage smoothing circuit according to another embodiment of the invention. In this embodiment, a plurality of AC-DC converters are connected in parallel. In FIG. 6, reference numerals 2-1 to 2-n represent an AC-DC converter, reference numerals 7 and 11 represent an operational amplifier, reference numeral 12 represents a signal line, reference numeral 13 represents a diode, and reference numeral 14 represents a resistor. Other like elements to those shown in FIG. 5 are represented by using identical reference numerals.

Referring to FIG. 6, each AC-DC converter 2-1, ..., 2-n has the same circuit structure and is connected to an external a.c. power supply 1 in parallel. The internal circuit of the AC-DC converter 2-1 will be described in the following.

A voltage regulator 10 of the AC-DC converter 2-1 is connected to a d.c. output terminal 52 via the diode 13 and to a current detecting resistor 3. The d.c. output terminal 52 and ground terminal 51 are connected in common to corresponding terminals of other AC-DC converters, and to a load 9.

As the operational amplifiers 7 and 11 of this embodiment, an operational amplifier capable of being operated with a single power supply voltage and applied with a negative voltage is used similar to the embodiment shown in FIG. 5.

A positive power supply terminal 57 of the operational amplifier 7 is connected to the anode of the diode 13. An output terminal 54 of the operational amplifier 7 is connected to the non-inverting input terminal of the operational amplifier 11 and to one end of a resistor 14 whose other end is connected to the inverting input terminal of the operational amplifier 11. The signal line 12 is connected to the interconnection between the inverting input terminal of the operational amplifier 11 and the other end of the resistor 14. This signal line 12 is connected to corresponding interconnections of all the AC-DC converters 2-1 to 2-n. A positive power supply terminal of the operational amplifier 11 is connected to the anode of the diode 13, and a negative power supply terminal thereof is connected to the ground terminal 51. An output terminal of the operational amplifier 11 is connected to a signal transmission unit 8 which is connected to the ground terminal 51. The other structures of this circuit are similar to the embodiment shown in FIG. 5.

The operation of this embodiment circuit will be described with reference to FIG. 6.

Different points of this embodiment from that shown in FIG. 5 reside in that n AC-DC converters 2-1 to 2-n are connected in parallel, the diode 13 is connected to the output terminal of the AC-DC converter, the output terminal 54 of the operational amplifier 7 is connected to another operational amplifier 11 and resistor 14, and the signal line 12 is connected between all the AC-DC converters. These different points will be detailed. The other operations are similar to the embodiment shown in FIG. 5.

A d.c. current from the voltage regulator 10 flows through a closed loop path from the diode 13, to the d.c. output terminal 52, to the load 9, to the ground terminal 51, to the current detecting resistor 3, and back to the voltage regulator 10. This current flow is also the same in the case of the other AC-DC converters. A total output current of the AC-DC converters 2-1 to 2-n flows through the load 9. An output current of each AC-DC converter is reflected upon a voltage at the output terminal 54 of the operational amplifier 7 which voltage is proportional to an instantaneous value of the output current, as described with the embodiment shown in FIG. 5. This voltage is inputted to the non-inverting input terminal of the operational amplifier 11. However, since the output terminal 54 of the operational amplifier 7 is connected to the resistor 14 which is in turn connected to the signal line 12, a voltage at the signal line 12 is an average value of respective output voltages at the output terminals 54 of all the AC-DC converters. This average voltage is proportional to an average value of output current of all the AC-DC converters. The average voltage is applied to the inverting input terminal of the operational amplifier 11, whereas the voltage at the output terminal 54 is directly applied to the non-inverting input terminal. These two voltages are compared by the operational amplifier 11. This means a comparison between an instantaneous current of each AC-DC converter and an average current of all the AC-DC converters. Namely, an output voltage of the operational amplifier 11 is a voltage obtained by amplifying a difference between the instantaneous current and the average current. In this embodiment, this difference amplified voltage is supplied to the signal transmission unit 8 which in turn supplies a current error signal to the voltage regulator 10 to control reducing the difference to become 0. This control method is hereinafter called an average current follower or average current tracking control method.

In this average current tracking method, consider now the case wherein an output voltage of the AC-DC converter is controlled to be constant by pulse width modulation by which a ratio of an on-period to an off-period of a switching element used in the voltage regulator 10 is changed with a difference between the instantaneous value of the output voltage of the AC-DC converter and a target voltage value. In such a case, the output voltage is minutely changed by adding or subtracting the current difference signal value to or from the target voltage value so that the output current can be controlled.

In this embodiment, it is possible to quickly and precisely detect an output current of each AC-DC converter connected in parallel by using a simple circuit structure and an operational amplifier with a single power supply voltage without using dedicated power supply voltages for it. It is also possible to perform an average current tracking control for controlling the output current of each of the AC-DC converters to be uniform, by calculating the average value of the output current of all the AC-DC converters and feeding back each current difference to the control circuit such as a PWM control circuit. Furthermore, positive and negative power supply voltages dedicated to each AC-DC converter are not needed. Therefore, it is possible to promote reducing the number of circuit components and the cost and size of the apparatus.

Also in this embodiment, although an AC-DC converter for converting an a.c. voltage into a d.c. voltage has been described, a DC-DC converter for converting a d.c. voltage into a different d.c. voltage or other electronic devices may also be used.

Figure 7:
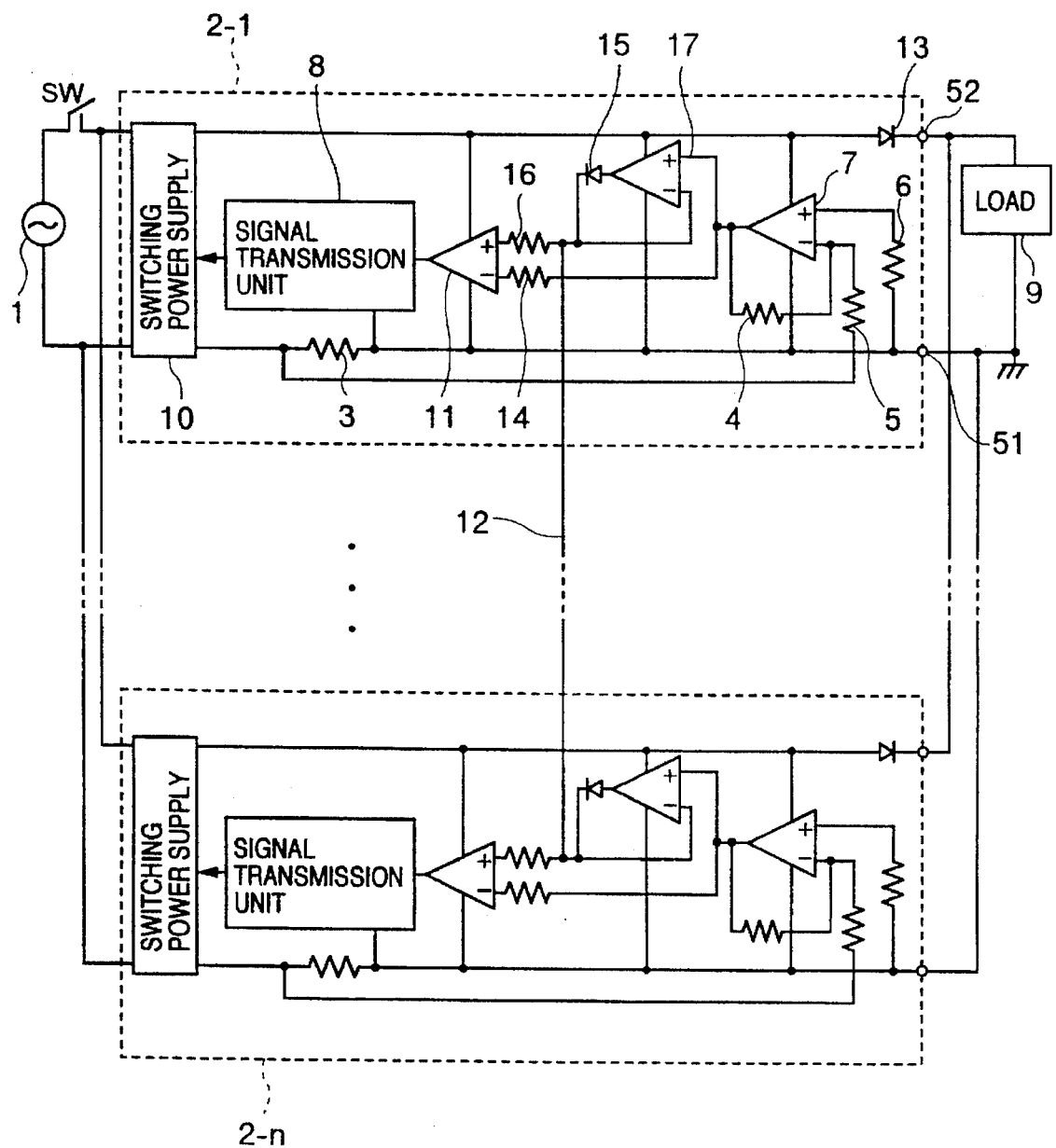
FIG. 7 is a circuit diagram partially in blocks showing an example of the structure of a power supply system according to a further embodiment of the invention.

FIG. 7 shows the structure of a voltage smoothing circuit according to another embodiment of the invention. A plurality of AC-DC converters are connected in parallel, similar to the embodiment shown in FIG. 6. In FIG. 7, reference numeral 15 represents a diode, reference numeral 16 represents an input resistor, and reference numeral 17 represents an operational amplifier. Other like elements to those shown in FIG. 5 and 6 are represented by using identical reference numerals.

In FIG. 7, n AC-DC converters 2-1 to 2-n have the same structure and is connected to an a.c external power supply 1 in parallel. Different points of this embodiment from the embodiment shown in FIG. 6 are as follows. The output terminal of the operational amplifier 7 is connected to the non-inverting output terminal of the operational amplifier 17, the output terminal of the operational amplifier 17 is connected to the anode of the diode 15, the cathode of the diode 15 is connected to the inverting input terminal of the operational amplifier 17 and to one end of the input resistor 16, the other end of the input resistor 15 is connected to the positive input terminal 16 of the operational amplifier 11, and the cathode of the diode 15 is connected to the signal line 12. The other circuit structures are the same as the embodiment shown in FIG. 6. As the operational amplifiers 7, 11, and 11 of this embodiment, an operational amplifier capable of being operated with a single power supply voltage and applied with a negative voltage is used similar to the embodiments shown in FIGS. 5 and 6.

The operation of this embodiment circuit will be described in detail regarding to only different points from those described with FIG. 6. The other circuit operations are similar to those of the embodiment shown in FIG. 6.

A voltage proportional to an output current of each AC-DC converter is outputted from the output terminal of the operational amplifier 7. This output voltage is applied to the non-inverting input terminal of the operational amplifier 17. To the inverting input terminal thereof, a voltage on the signal line 12 is inputted. The operational amplifier 17 with the diode 15 constitutes a so-called voltage follower. Therefore, if an instantaneous value of the voltage at the non-inverting input terminal of the operational amplifier 17 is higher than the voltage on the signal line 12, the voltage on the signal line 12 rises to the same value as the instantaneous value of the voltage at the non-inverting input terminal. On the other hand, if an instantaneous value of the voltage at the non-inverting input terminal of the operational amplifier 17 is lower than the voltage on the signal line 12, the voltage on the signal line 12 does not change. Therefore, the voltage on the signal line 12 is always the highest voltage among the output voltages of the operational amplifiers 7 of all the AC-DC converters. In other words, the signal line 12 has a maximum value of the output current among all the AC-DC converters. The operational amplifier 11 is applied with the voltage on the signal line 12 at its non-inverting terminal via the input resistor 16, and with the output voltage of the operational amplifier 7 at its inverting input terminal via the input resistor 14. The operational amplifier 11 with the diode 15 being connected at the output terminal of the operational amplifier 17 therefore performs an operation equivalent to that the maximum value of the output current among all the AC-DC converters is compared with the instantaneous value of the output current of this operational amplifier 11. A difference signal is transmitted to the signal transmission unit 8 for the control of the voltage regulator 10. The voltage regulator 10 operates to control in such a manner that the difference outputted by the operational amplifier 11 becomes 0. As a result, the output voltages of all the AC-DC converters rise to the extent of a current-voltage equilibrium state so as to follow the maximum value of an output current of each AC-DC converter. Therefore, the output current of each AC-DC converter becomes the same, and the output voltage thereof is also set within a desired range. The control method of this embodiment in which the output current of all the AC-DC converter is made to follow the maximum current and become 0, is called hereinafter a maximum current tracking control method.

The maximum current tracking control method operates differently from the average current tracking control method of the embodiment shown in FIG. 6 in the following circumstances, while a number of AC-DC converters are running to supply power to loads.

For example, when one of AC-DC converters becomes abnormal and reduces its output current, the total output current of the AC-DC converters also reduces and it becomes necessary to compensate for the reduced current by increasing the current of the other normal AC-DC converters. In this case, with the average current tracking control method, the voltage on the signal line 12 takes a value proportional to an average value of the output current of all the AC-DC converters. Therefore, the voltage on the signal line 12 lowers so that the other normal AC-DC converters also lower their output current. With the average current tracking control method, therefore, in order to prevent the voltage on the signal line 12 from being lowered when some AC-DC converter becomes abnormal, it is necessary to locate an abnormal AC-DC converter and disconnect it from the signal line 12.

With the maximum current tracking control method, however, even if one of AC-DC converters becomes abnormal and reduces its output current, the voltage on the signal line 12 is not affected by the reduced current, but the current of the other normal AC-DC converters quickly rises and reaches an equilibrium state to compensate for the reduced current.

As above, the maximum current tracking control method of this embodiment is advantageous in that it is not necessary to locate an abnormal AC-DC converter and disconnect it from the signal line 12, as compared to the average current tracking control method.

In this embodiment, the output current of each of the AC-CD converters connected in parallel is detected, the maximum value of the output current of all the AC-DC converters is detected, and a difference between the maximum value and the instantaneous value of the output current of each AC-DC converter is detected and fed back to the voltage regulator. Accordingly, the output current of all the AC-DC converters connected in parallel can be made the same, by using a simple circuit structure. Furthermore, an operational amplifier with a single power supply voltage can be used without using dedicated positive and negative power supply voltages for it, and it is not necessary to detect an abnormal AC-DC converter and disconnect it from the signal line, as compared to the average current tracking control method. It is therefore possible to promote reducing the number of circuit components and the cost and size of the apparatus.

Also in this embodiment, although an AC-DC converter for converting an a.c. voltage into a d.c. voltage has been described, a DC-DC converter for converting a d.c. voltage into a different d.c. voltage or other electronic devices may also be used.

Figure 8:
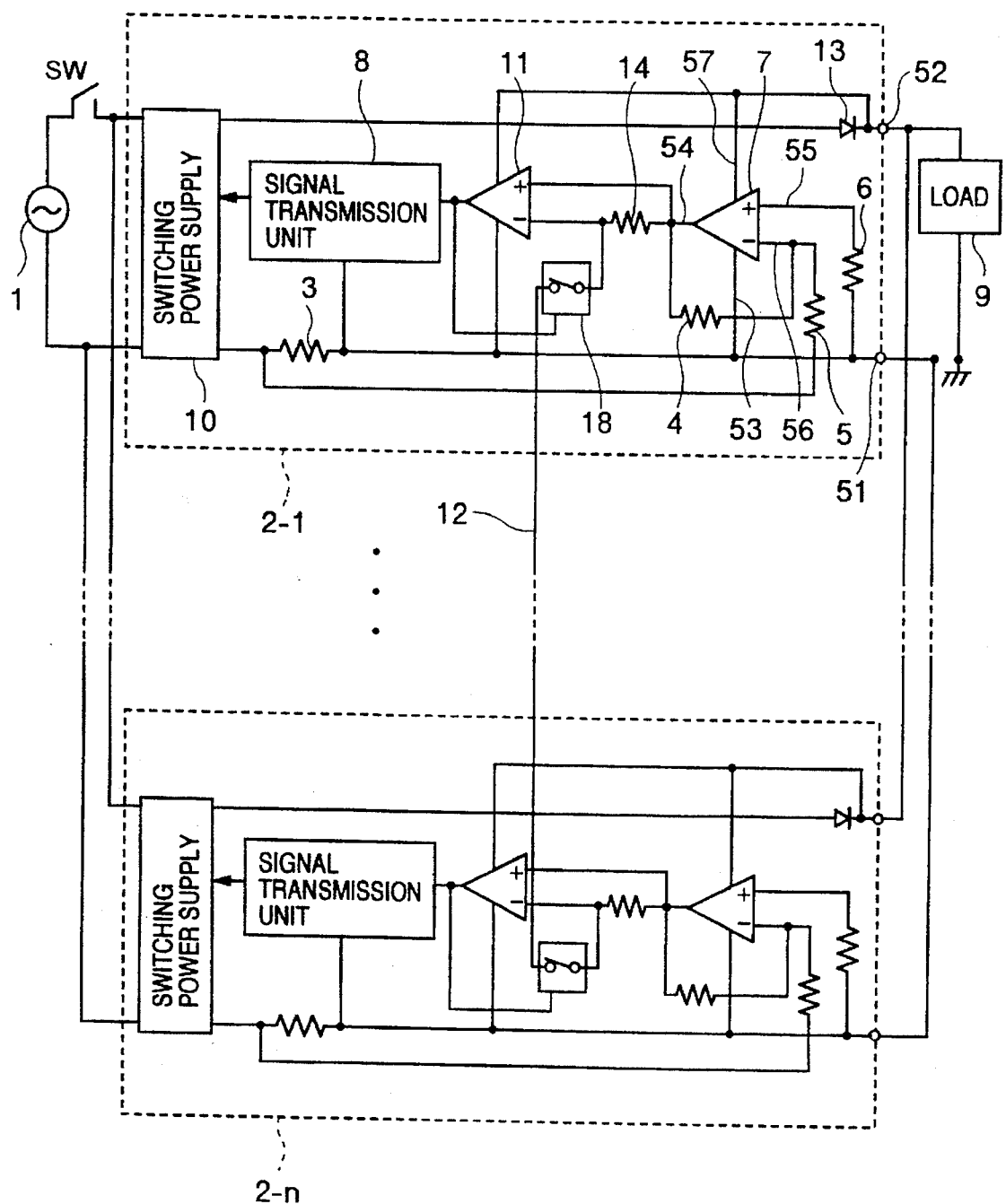
FIG. 8 is a circuit diagram partially in blocks showing an example of the structure of a power supply system according to a still further embodiment of the invention.

FIG. 8 shows the structure of a voltage smoothing circuit according to another embodiment of the invention. A plurality of AC-DC converters are connected in parallel, similar to the embodiments shown in FIGS. 6 and 7. In FIG. 8, n AC-DC converters 2-1 to 2-n have the same structure and are connected in parallel to an external a.c. power supply 1. The different points of this embodiment from the embodiment shown in FIG. 6 are as follows. Although in the embodiment shown in FIG. 6 the positive power supply terminals of the operational amplifiers 7 and 11 are connected to the anode of the diode 13, in the embodiment shown in FIG. 8 the positive power supply terminals of operational amplifiers 7 and 11 are connected to the cathode of the diode 13, and that a switch circuit 18 is connected between the inverting input terminal of the operational amplifier 11 and the signal line 12 and the output terminal of the operational amplifier 11 is connected to the switch circuit 18. Other circuit structures are the same as the embodiment of FIG. 6. Therefore, regarding to only different points from those described with FIG. 6, the operation of this embodiment circuit will be described in detail.

In this embodiment, since the positive power supply terminals of the operational amplifiers 7 and 11 are connected to the cathode of the diode 13, if at least one of the AC-DC converters 2-1 to 2-n continues to operate, the output voltage same as that of the one AC-DC converter applied to the load is applied to the operational amplifiers 7 and 11 of all the other AC-DC converters because of the presence of the diode 13, so that the normal operations of the AC-DC converters are ensured. Therefore, for example, even if one of the AC-DC converters becomes abnormal, the operational amplifiers 7 and 11 of the abnormal AC-DC converter continue to operate. Still further in this embodiment, the switch circuit 18 connected between the inverting input terminal of the operational amplifier 11 and the signal line 12 includes a detecting/disconnecting circuit for detecting an abnormal AC-DC converter and disconnecting it from the other normal AC-DC converters. Therefore, it is possible to disconnect an abnormal AC-DC converter from the other normal AC-DC converters by opening the switch circuit 18.

In this embodiment, when the detecting/disconnecting circuit of the switch circuit 18, which is connected to the operational amplifier 11, detects that the output voltage of the operational amplifier 11 becomes out of a predetermined range for a predetermined time period, it judges that its AC-DC converter is abnormal, and controls to open the switch circuit 18.

With the average current tracking control method, in general, it is necessary to detect an abnormal AC-DC converter and disconnect it from the signal line as described earlier, in order to prevent a voltage drop of the signal line to be otherwise caused by the abnormal AC-DC converter. In this embodiment, not only the operational amplifiers 7 and 11 of an abnormal AC-DC converter can continue to operate, but the abnormal AC-DC converter can also be automatically disconnected from the control system of parallel running AC-DC converters, by judging the operation condition of AC-DC converters from the output voltages of operational amplifiers 11.

Connecting the positive power supply terminals of the operational amplifiers 7 and 11 as in this embodiment may also be applied to the embodiment shown in FIG. 7 with similar advantages being expected.

Also in this embodiment, although an AC-DC converter for converting an a.c. voltage into a d.c. voltage has been described, a DC-DC converter for converting a d.c. voltage into a different d.c. voltage or other electronic devices may also be used.

Figure 9:
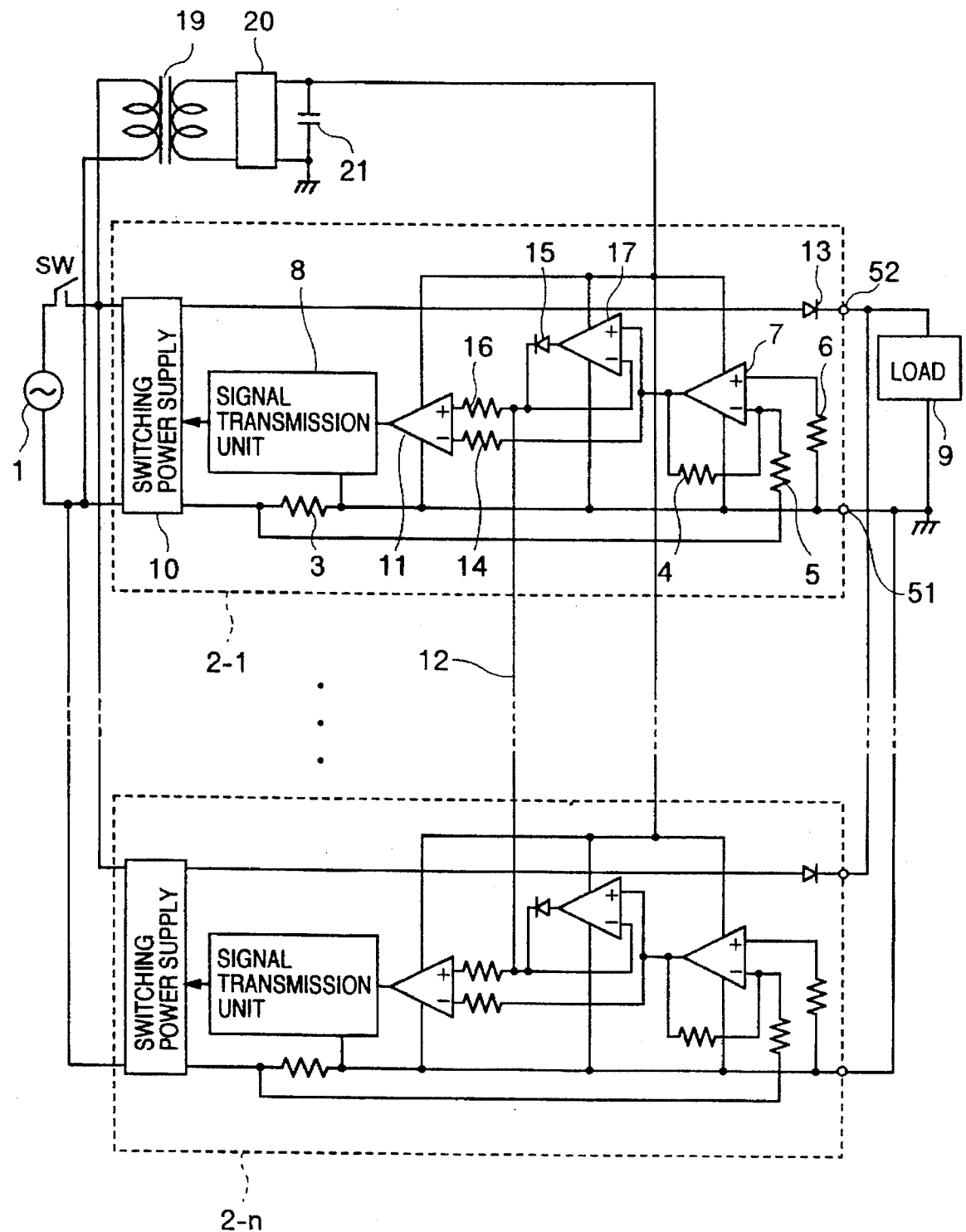
FIG. 9 is a circuit diagram partially in blocks showing an example of the structure of a power supply system according to still another embodiment of the invention.

FIG. 9 shows the structure of a voltage smoothing circuit according to another embodiment of the invention. A plurality of AC-DC converters are connected in parallel, similar to the embodiments shown in FIGS. 6 and 8.

In FIG. 9, n AC-DC converters 2-1 to 2-n have the same structure and are connected in parallel to an external a.c. power supply 1. The different points of this embodiment from the embodiment shown in FIG. 7 are as follows. Although in the embodiment shown in FIG. 7 the positive power supply terminals of the operational amplifiers 7, 11, and 17 are connected to the anode of the diode 13, in the embodiment shown in FIG. 9 the primary coil of a transformer 19 is connected to the external a.c. power supply 1, the secondary coil of the transformer 19 is connected to a rectifier circuit 20, a charge accumulating unit 21 is connected to the output of the rectifier circuit 20, and the positive power supply terminals of the operational amplifiers 7, 11, and 17 are connected to one terminal of the charge accumulating unit 21. Other circuit structures are the same as the embodiment of FIG. 7. Therefore, regarding to only different points from those described with FIG. 7, the operation of this embodiment circuit will be described in detail.

In this embodiment, the primary coil of the transformer 19 is connected to the external a.c. power supply 1, and the secondary coil of the transformer 19 is connected to the rectifier circuit 20. A rectified d.c. voltage supplied from the rectifier circuit 20 is smoothed by the charge accumulating unit 21 connected to the rectifier circuit 20. The smoothed d.c. voltage is supplied to the operational amplifiers 7, 11, and 17 of all the AC-DC converters. Therefore, the operational amplifiers 7, 11, and 17 can continue to operate irrespective of the operation conditions of the AC-DC converters.

In this embodiment, it is possible to detect or control an excessive output current of the AC-DC converters when they start operating. Furthermore, even if the voltage regulator 10 of the AC-DC converter becomes defective, the outputs of the operational amplifiers 7, 11, and 12 are retained in a normal state.

Also in this embodiment, a stable voltage can be supplied to the operational amplifiers 7, 11, and 17. In addition, since this power supply voltage is applied in common to all the AC-DC converters 2-1 to 2-n, the number of components and the cost of the apparatus can be reduced as compared to a conventional system using positive and negative two power supply voltages.

The additional d.c. power supply of this embodiment may be applied to the embodiments shown in FIGS. 7 and 8 to supply a stable voltage to the operational amplifiers 7, 11, and 11 (FIG. 7 only).

Also in this embodiment, although an AC-DC converter for converting an a.c. voltage into a d.c. voltage has been described, a DC-DC converter for converting a d.c. voltage into a different d.c. voltage or other electronic devices may also be used.

Figure 10:
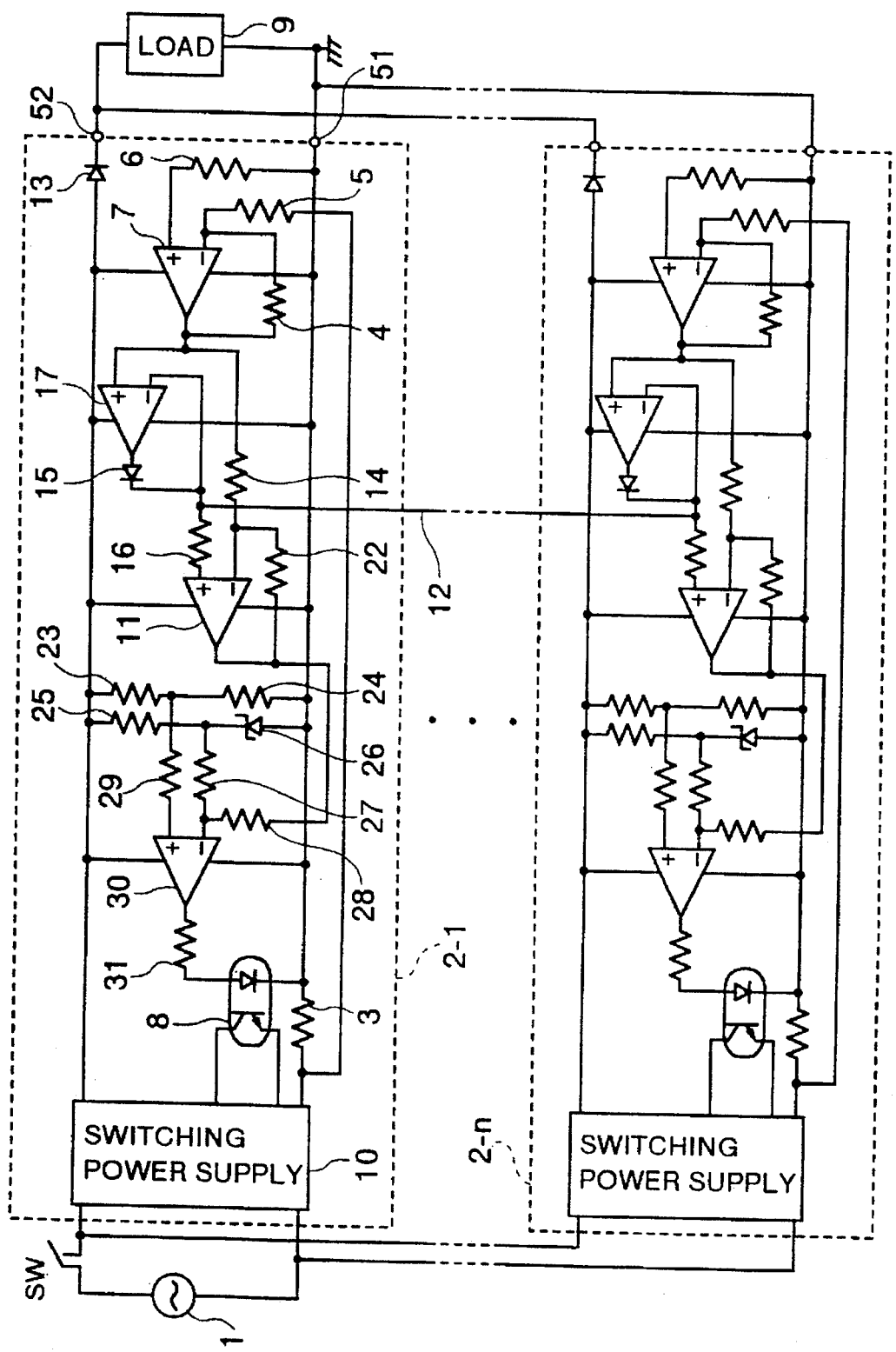
FIG. 10 is a circuit diagram partially in blocks showing an example of the structure of a power supply system according to a further embodiment of the invention.

FIG. 10 shows the structure of a voltage smoothing circuit according to another embodiment of the invention. A plurality of AC-DC converters are connected in parallel, similar to the embodiments shown in FIGS. 6 to 9.

In FIG. 10, n AC-DC converters 2-1 to 2-n have the same structure and are connected in parallel to an external a.c. power supply 1. Reference numeral 22 represents a feedback resistor, reference numerals 23, 24, and 25 represent a resistor, reference numeral 26 represents a constant voltage unit, reference numerals 27, 28, and 29 represent an input resistor, reference numeral 30 represents an operational amplifier, and reference numeral 31 represents a resistor.

The internal circuit of the AC-DC converter 2-1 will be described.

In this embodiment, the feedback resistor 22 is connected between the output terminal and inverting input terminal of the operational amplifier 11. An output of the operational amplifier 11 is inputted via the input resistor 28 to the inverting input terminal of the operational amplifier 30. A serial circuit of the resistors 23 and 24 is connected between the anode of the diode 13 and the ground terminal 51. An interconnection between the resistors 23 and 24 is connected to the non-inverting terminal of the operational amplifier 30. A serial circuit of the resistor 25 and the constant voltage unit 26 is connected between the anode of the diode 13 and the ground terminal 51. The constant voltage unit 26 may be simply realized by a constant voltage diode (Zener diode). An interconnection between the resistor 25 and the constant voltage unit 26 is connected via the input resistor 27 to the inverting input terminal of the operational amplifier 30. The positive power supply terminal of the operational amplifier 30 is connected to the anode of the diode 13, and the negative power supply terminal of the operational amplifier 30 is connected to the ground terminal 51. The output terminal of the operational amplifier 30 is connected via the resistor 31 to the signal transmission unit 8. The different points of the circuit structure of this embodiment from the embodiment shown in FIG. 7 are as follows. The other circuit structures are the same as those shown in FIG. 7.

Therefore, regarding to only the different points, the operation of this embodiment will be described hereinunder.

The serial circuit of the resistors 23 and 24 connected between the anode of the diode 13 and the ground terminal 51 functions as voltage division resistors for detecting the output voltage of the AC-DC converter 2-1. The other serial circuit of the resistor 25 and the constant voltage unit 26 connected between the anode of the diode 13 and the ground terminal 51 functions as a circuit for setting a reference voltage. Therefore, a voltage proportional to the instantaneous value of an output voltage of the AC-DC converter 2-1 is applied to the non-inverting terminal of the operational amplifier 30, and a constant voltage determined by the constant voltage unit 26 as the reference voltage is applied to the inverting input terminal. The operational amplifier 30 compares the instantaneous voltage of an output voltage of the AC-DC converter 2-1 with the reference voltage determined by the constant voltage unit 26, so as to operate to control in such a manner that the output voltage of the AC-DC converter 2-1 becomes constant, i.e., to perform a so-called voltage control. The output of the operational amplifier 11 is added via the input resistor 28 to the inverting input terminal of the operational amplifier 30. Therefore, as the output of the operational amplifier 11 increases, this increased output is added to the reference voltage determined by the constant voltage unit 26. As a result, the output of the AC-DC converter 2-1 is also controlled by the output of the operational amplifier 11 which output is an amplified difference from the maximum voltage on the signal line 12 obtained by the maximum current tracking control method.

As above, in this embodiment, it is possible to perform at the same time both a voltage control for maintaining the output voltage constant and a balance control, i.e., a control for the same output current of the AC-DC converters obtained by the maximum current tracking control method.

Also in this embodiment, although an AC-DC converter for converting an a.c. voltage into a d.c. voltage has been described, a DC-DC converter for converting a d.c. voltage into a different d.c. voltage or other electronic devices may also be used.

What is claimed is:

1. A parallelized power supply system, comprising:
    a switch connectable to an a.c. power supply; and
    a plurality of switching power supplies each connected to said switch,
    wherein each of said switching power supplies comprises:
        a relay contact unit to be connected to said switch, said relay contact unit having relay contacts and a relay coil;
        an AC-DC converter for converting an a.c. power supplied via said switch and said relay contact unit into a d.c. power;
        a resistor connected in parallel to said relay contact unit; and
        a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c. power supply and a voltage of the d.c. power reaches a predetermined level.

2. A parallelized power supply system according to claim 1, wherein at least two switching power supplies among said plurality of switching power supplies have generally the same rated d.c. output voltage, each of said at least two switching power supplies has a rectifier element at an output terminal of said switching power supply, and an output from each said rectifier element is combined and supplied to the load.

3. A parallelized power supply system according to claim 2, wherein at least another switching power supply among said plurality of switching power supplies has a rated d.c. output voltage different from said same rated d.c. output voltage, said relay driving power supply supplies driving current to the relay coil of said at least another switching power supply to make a connection of said relay contact unit when a time different from said predetermined time lapses after the power is received from the a.c. power supply, and an output of said at least another switching power supply is supplied to a load different from said load.

4. A parallelized power supply system according to claim 2, further comprising:
a printed circuit board connected to said switch, said printed circuit board including a connector into which said switching power supply and another connector for receiving the d.c. output voltage from said switching power supply.

5. A parallelized power supply system according to claim 1, wherein at least two relay driving power supplies of said plurality of switching power supplies have each a different one of said predetermined time.

6. A parallelized power supply system, comprising:
a switch connectable to an a.c. power supply; and
a plurality of switching power supplies each connected to said switch,
wherein each of said switching power supplies comprises:
a relay contact unit to be connected to said switch, said relay contact unit having relay contacts and a relay coil;
an AC-DC converter for converting an a.c. power supplied via said switch and said relay contact unit into a d.c. power;
a resistor connected in parallel to said relay contact unit; and
a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c. power supply and a voltage of the d.c. power reaches a predetermined level;
wherein said AC-DC converter comprises:
a rectifier circuit for rectifying a.c. current supplied from the a.c. power supply;
a power regulator connected to said rectifier circuit for regulating a d.c. voltage supplied from said rectifier circuit;
a differential amplifier operable with a single power supply voltage for detecting a d.c. current supplied to a load and flowing from a high voltage side of the load to a low voltage side of the load;
a wire interconnecting a low voltage side of the single power supply voltage for said differential amplifier and the low voltage side of the load;
another wire interconnecting a high voltage side of the single power supply voltage for said differential amplifier and the high voltage side of the load;
a resistor for flowing the d.c. current supplied to the load from the high voltage side of the load to the low voltage side of the load, said resistor being connected between the low voltage side of the load and a high voltage side of said power regulator; and
two resistors connected between two input terminals of said differential amplifier and both ends of said resistor for flowing the d.c. current.

7. A parallelized power supply system according to claim 6, further comprising:
a power thermistor connected between said rectifier circuit and said power regulator, said power thermistor having a larger resistance value at small current than at large current.

8. A parallelized power supply system, comprising:
a switch connectable to an a.c. power supply; and
a plurality of switching power supplies each connected to said switch,
wherein each of said switching power supplies comprises:
a relay contact unit to be connected to said switch, said relay contact unit having relay contacts and a relay coil;
an AC-DC converter for converting an a.c. power supplied via said switch and said relay contact unit into a d.c. power;
a resistor connected in parallel to said relay contact unit; and
a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c. power supply and a voltage of the d.c. power reaches a predetermined level;
wherein at least two switching power supplies among said plurality of switching power supplies have generally the same rated d.c. output voltage, each of said at least two switching power supplies has a rectifier element at an output terminal of said switching power supply, and an output terminal of said switching power supply, and an output from each said rectifier element is combined and supplied to the load;
wherein at least another switching power supply among said plurality of switching power supplies has a rated d.c. output voltage different from said same rated d.c. output voltage, said relay driving power supply supplies driving current to the relay coil of said at least another switching power supply to make a connection of said relay contact unit when a time different from said predetermined time lapses after the power is received from the a.c. power supply, and an output of said at least another switching power supply is supplied to a load different from said load;
wherein said AC-DC converter comprises:
a rectifier circuit for rectifying a.c. current supplied from the a.c. power supply;
a power regulator connected to said rectifier circuit for regulating a d.c. voltage supplied from said rectifier circuit;
a differential amplifier operable with a single power supply voltage for detecting a d.c. current supplied to a load and flowing from a high voltage side of the load to a low voltage side of the load;
a wire interconnecting a low voltage side of the single power supply voltage for said differential amplifier and the low voltage side of the load;
another wire interconnecting a high voltage side of the single power supply voltage for said differential amplifier and the high voltage side of the load;
a resistor for flowing the d.c. current supplied to the load from the high voltage side of the load to the low voltage side of the load, said resistor being connected between the low voltage side of the load and a high voltage side of said power regulator; and two resistors connected between two input terminals of said differential amplifier and both ends of said resistor.

9. A parallelized power supply system, comprising:

a switch connectable to an a.c. power supply; and a plurality of switching power supplies each connected to said switch, wherein each of said switching power supplies comprises:

a relay contact unit to be connected to said switch, said relay contact unit having relay contacts and a relay coil;

an AC-DC converter for converting an a.c. power supplied via said switch and said relay contact unit into a d.c. power;

a resistor connected in parallel to said relay contact unit; and a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c. power supply and a voltage of the d.c. power reaches a predetermined level;

wherein said relay driving power supply has operational amplifier means, said operational amplifier means operating, when a connection of the relay contacts is broken in accordance with a voltage of said a.c. power source lowered after said switch is turned off, to break the connection of said relay contacts in response to when the voltage of the d.c. power lowers more than said predetermined level.

10. A parallelized power supply system, comprising:

a switch connectable to an a.c. power supply; and a plurality of switching power supplies each connected to said switch, wherein each of said switching power supplies comprises:

a relay contact unit to be connected to said switch, said relay contact unit having relay contacts and a relay coil;

an AC-DC converter for converting an a.c. power supplied via said switch and said relay contact unit into a d.c. power;

a resistor connected in parallel to said relay contact unit; and a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c. power supply and a voltage of the d.c. power reaches a predetermined level;

wherein each of said plurality of switching power supplies comprises:

two transistors connected to the relay coil; and two operational amplifiers connected to said two transistors for driving said two transistors when different times lapse after the a.c. power is received from the a.c. power supply, wherein said two transistors are connected in series so as to make a connection of the relay contacts by supplying the driving current to the relay coil when both said two transistors are driven.

11. A parallelized power supply system, comprising:

a switch connectable to an a.c. power supply; and a plurality of switching power supplies each connected to said switch, wherein each of said switching power supplies comprises:

a relay contact unit to be connected to said switch, said relay contact unit having relay contacts and a relay coil;

an AC-DC converter for converting an a.c. power supplied via said switch and said relay contact unit into a d.c. power;

a resistor connected in parallel to said relay contact unit; and a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c. power supply and a voltage of the d.c. power reaches a predetermined level;

wherein a first switching power supply of said plurality of switching power supplies includes a first relay driving power supply for making a connection of first relay contacts by supplying the driving current to a first coil when a first predetermined time lapses after the a.c. power is received from the a.c. power supply, and a second switching power supply of said plurality of switching power supplies includes a second relay driving power supply for making a connection of second relay contacts by supplying the driving current to a second coil when a second predetermined time different from said first predetermined time lapses after the a.c. power is received from the a.c. power supply.

12. A parallelized power supply system, comprising:

a switch connectable to an a.c. power supply; and a plurality of switching power supplies each connected to said switch, wherein each of said switching power supplies comprises:

a relay contact unit to be connected to said switch, said relay contact unit having relay contacts and a relay coil;

a rectifier circuit for rectifying a.c. current supplied from the a.c. power supply via said switch and said relay contact unit;

a power regulator connected to said rectifier circuit for regulating a d.c. voltage supplied from said rectifier circuit;

a differential amplifier operable with a single power supply voltage for detecting a d.c. current supplied to a load and flowing from a high voltage side of the load to a low voltage side of the load;

a wire interconnecting a low voltage side of the single power supply voltage for said differential amplifier and the low voltage side of the load;

another wire interconnecting a high voltage side of the single power supply voltage for said differential amplifier and the high voltage side of the load;

a resistor for flowing the d.c. current supplied to the load from the high voltage side of the load to the low voltage side of the load, said resistor being connected between the low voltage side of the load and a high voltage side of said power regulator;

two resistors connected between two input terminals of said differential amplifier and both ends of said resistor;

a resistor connected in parallel to said relay contact unit;

a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c. power supply and a voltage of the d.c. power reaches a predetermined level; and a diode connected to an output terminal of said power regulator, and wherein the parallelized power supply system further comprises:

a wire interconnecting an output terminal of each diode of said plurality of switching power supplies and connecting the output terminal to said load; and an average voltage wire interconnecting an output terminal of each differential amplifier of said plurality of switching power supplies, with an input resistor being interposed between the output terminal and said average voltage wire.

13. A parallelized power supply system according to claim 12, wherein each of said plurality of switching power supplies comprises:

a switch circuit connected between the input resistor of the switching power supply and said average voltage wire; and a control circuit connected to an output terminal of said differential amplifier for opening said switch circuit when a voltage out of a predetermined range is detected.

14. A parallelized power supply system, comprising:

a switch connectable to an a.c. power supply; and a plurality of switching power supplies each connected to said switch, wherein each of said switching power supplies comprises:

a relay contact unit to be connected to said switch, said relay contact unit having relay contacts and a relay coil;

a rectifier circuit for rectifying a.c. current supplied from the a.c. power supply via said switch and said relay contact unit;

a power regulator connected to said rectifier circuit for regulating a d.c. voltage supplied from said rectifier circuit;

a differential amplifier operable with a single power supply voltage for detecting a d.c. current supplied to a load and flowing from a high voltage side of the load to a low voltage side of the load;

a wire interconnecting a low voltage side of the single power supply voltage for said differential amplifier and the low voltage side of the load;

a resistor for flowing the d.c. current supplied to the load from the high voltage side of the load to the low voltage side of the load, said resistor being connected between the low voltage side of the load and a high voltage side of said power regulator;

two resistors connected between two input terminals of said differential amplifier and both ends of said resistor;

a resistor connected in parallel to said relay contact unit;

a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c. power supply and a voltage of the d.c. power reaches a predetermined level; and a diode connected to an output terminal of said power regulator, and wherein the parallelized power supply system further comprises:

a wire interconnecting an output terminal of each diode of said plurality of switching power supplies and connecting the output terminal to said load;

an operational amplifier connected to an output terminal of each differential amplifier of said plurality of switching power supplies; and a maximum voltage wire interconnecting an output terminal of each said operational amplifier of said plurality of switching power supplies, with a diode being interposed between the output terminal of said operational amplifier and said maximum voltage wire.

15. A parallelized power supply system according to claim 14, wherein each of said plurality of switching power supplies comprises:

a second rectifier circuit for rectifying a.c. current supplied from the a.c. power supply via said switch and said relay contact unit; and another power supply wire coupling the high voltage side of the single power supply voltage for each said differential amplifier and each said operational amplifier and a d.c. voltage obtained from said second rectifier circuit.

16. A parallelized power supply system according to claim 14, wherein each of said plurality of switching power supplies comprises:

means for detecting an output voltage of said power regulator;

means for generating a reference voltage;

means for adding said reference voltage to a difference obtained through comparison between a voltage on said maximum voltage wire and a voltage detected by said detecting means; and means for controlling the output voltage of said power regulator in accordance with an output from said adding means.

17. A parallelized power supply system, comprising:

a switch connectable to an a.c. power supply; and a switching power supply connected to said switch, wherein said switching power supply comprises:

a relay contact unit to be connected to said switch, said relay contact unit having relay contacts and a relay coil;

a resistor connected in parallel to said relay contact unit;

a relay driving power supply for receiving power from the a.c. power supply via said switch and said resistor, supplying a d.c. power for activating or inactivating said relay contact unit, and making a connection of said relay contact unit by supplying driving current to the relay coil if a predetermined time lapses after the power is received from the a.c.

power supply and a voltage of the d.c. power reaches a predetermined level;

a rectifier circuit for rectifying a.c. current supplied from the a.c. power supply via said switch and said relay contact unit;

a power regulator connected to said rectifier circuit for regulating a d.c. voltage supplied from said rectifier circuit;

a differential amplifier operable with a single power supply voltage for detecting a d.c. current supplied to a load and flowing from a high voltage side of the load to a low voltage side of the load;

a wire interconnecting a low voltage side of the single power supply voltage for said differential amplifier and the low voltage side of the load;

another wire interconnecting a high voltage side of the single power supply voltage for said differential amplifier and the high voltage side of the load;

a resistor for flowing the d.c. current supplied to the load from the high voltage side of the load to the low voltage side of the load, said resistor being connected between the low voltage side of the load and a high voltage side of said power regulator; and resistor means connected to two input terminals of said differential amplifier and both ends of said resistor for flowing the d.c. current.

18. A parallelized power supply system according to claim 17, wherein a non-inverting input terminal among said two input terminals of said differential amplifier is applied with a ground potential via said resistor means, and an inverting terminal thereof is applied with a negative potential of said resistor via said resistor means.

* * * * *